US012561485B2

(12) United States Patent
Perlman et al.

(10) Patent No.: US 12,561,485 B2
(45) Date of Patent: Feb. 24, 2026

(54) HARDWARE IDENTITY RESTORATION POST-DEVICE REPAIR

(71) Applicant: Microsoft Technology Licensing, LLC, Redmond, WA (US)

(72) Inventors: Brian Stuart Perlman, Granite Falls, WA (US); Daniel Chavez Zayas, Seattle, WA (US); Eric Phuoc Huang, Bellevue, WA (US); Marilyn Lai Sun, Bellevue, WA (US); Hung Minh Dang, Seattle, WA (US); Juanita Jestina Baptiste, Sacramento, CA (US); Zakariyah Toyer, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 281 days.

(21) Appl. No.: 17/828,876

(22) Filed: May 31, 2022

(65) Prior Publication Data

US 2023/0297724 A1 Sep. 21, 2023

Related U.S. Application Data

(60) Provisional application No. 63/320,025, filed on Mar. 15, 2022.

(51) Int. Cl.
*H04L 9/08* (2006.01)
*G06F 21/60* (2013.01)
(Continued)

(52) U.S. Cl.
CPC ............ *G06F 21/73* (2013.01); *G06F 21/602* (2013.01); *H04L 9/0869* (2013.01); *G06F 21/107* (2023.08)

(58) Field of Classification Search
CPC ...... G06F 21/73; G06F 21/602; G06F 21/107; G06F 21/57; H04L 9/0869
See application file for complete search history.

(56) References Cited

U.S. PATENT DOCUMENTS

| | | |
|---|---|---|
| 7,007,300 B1 | 2/2006 | Weber et al. |
| 7,302,590 B2 | 11/2007 | Dublish et al. |
| (Continued) | | |

OTHER PUBLICATIONS

"International Search Report and Written Opinion Issued in PCT Application No. PCT/US23/012567", Mailed Date: May 30, 2023, 9 Pages.

(Continued)

*Primary Examiner* — Khoi V Le
(74) *Attorney, Agent, or Firm* — Weaver IP L.L.C.

(57) ABSTRACT

Embodiments described herein involve building upon a hardware identity of a device and using it to match and detect hardware changes on the device and to identify potential identity mismatches. At initialization, the device also generates a globally-unique identification (GUID) marker that persists across operating system (OS) reinstallations. On the device, there is a periodic routine that detects hardware mismatches by comparing the current identity of the device with a cached version, along with the GUID. Once a change is detected, the device sends a request to a service that stores a hint (e.g., the GUID) for a later secure restoration attempt. A remote service (e.g., a cloud-based service) then attempts to restore the hardware identity of the device upon next check-in via a secure transmission of the updated identity, as well as resolving conflicts in a device record maintained by the remote service.

21 Claims, 6 Drawing Sheets

(51) Int. Cl.
   *G06F 21/73* (2013.01)
   *G06F 21/10* (2013.01)

(56) References Cited

U.S. PATENT DOCUMENTS

| | | | |
|---|---|---|---|
| 8,260,818 B1 | 9/2012 | Polydov | |
| 8,266,249 B2 | 9/2012 | Hu | |
| 9,602,292 B2 | 3/2017 | Ramatchandirane | |
| 9,647,837 B2 | 5/2017 | Gorbach et al. | |
| 10,313,134 B2 | 6/2019 | Smith et al. | |
| 11,086,839 B2 | 8/2021 | Mietke | |
| 2006/0080493 A1* | 4/2006 | Leon | G06F 11/1435 |
| | | | 711/202 |
| 2009/0037746 A1* | 2/2009 | Abdallah | H04L 9/3263 |
| | | | 713/186 |
| 2009/0043864 A1* | 2/2009 | Shetty | H04L 12/66 |
| | | | 707/999.102 |
| 2011/0289305 A1 | 11/2011 | Zimmer et al. | |
| 2012/0008786 A1 | 1/2012 | Cronk et al. | |
| 2014/0090016 A1 | 3/2014 | Kruglick | |
| 2014/0173071 A1* | 6/2014 | Hazen | H04L 63/0876 |
| | | | 709/223 |
| 2019/0319921 A1 | 10/2019 | Nishizaki | |
| 2021/0359992 A1 | 11/2021 | Parkinson et al. | |
| 2021/0382967 A1* | 12/2021 | Goergen | H04L 9/3263 |
| 2022/0171840 A1* | 6/2022 | Balin | G06F 21/73 |

OTHER PUBLICATIONS

"Validating Receipts on the Device", Retrieved from: http://web.archive.org/web/20210928061144/https://developer.apple.com/documentation/appstorereceipts/validating_receipts_on_the_device, Sep. 28, 2021, 5 Pages.

Junker, et al., "Windows Information Protection (WIP)", Retrieved from: https://docs.microsoft.com/en-us/windows/uwp/enterprise/wip-hub, Jan. 25, 2022, 5 Pages.

* cited by examiner

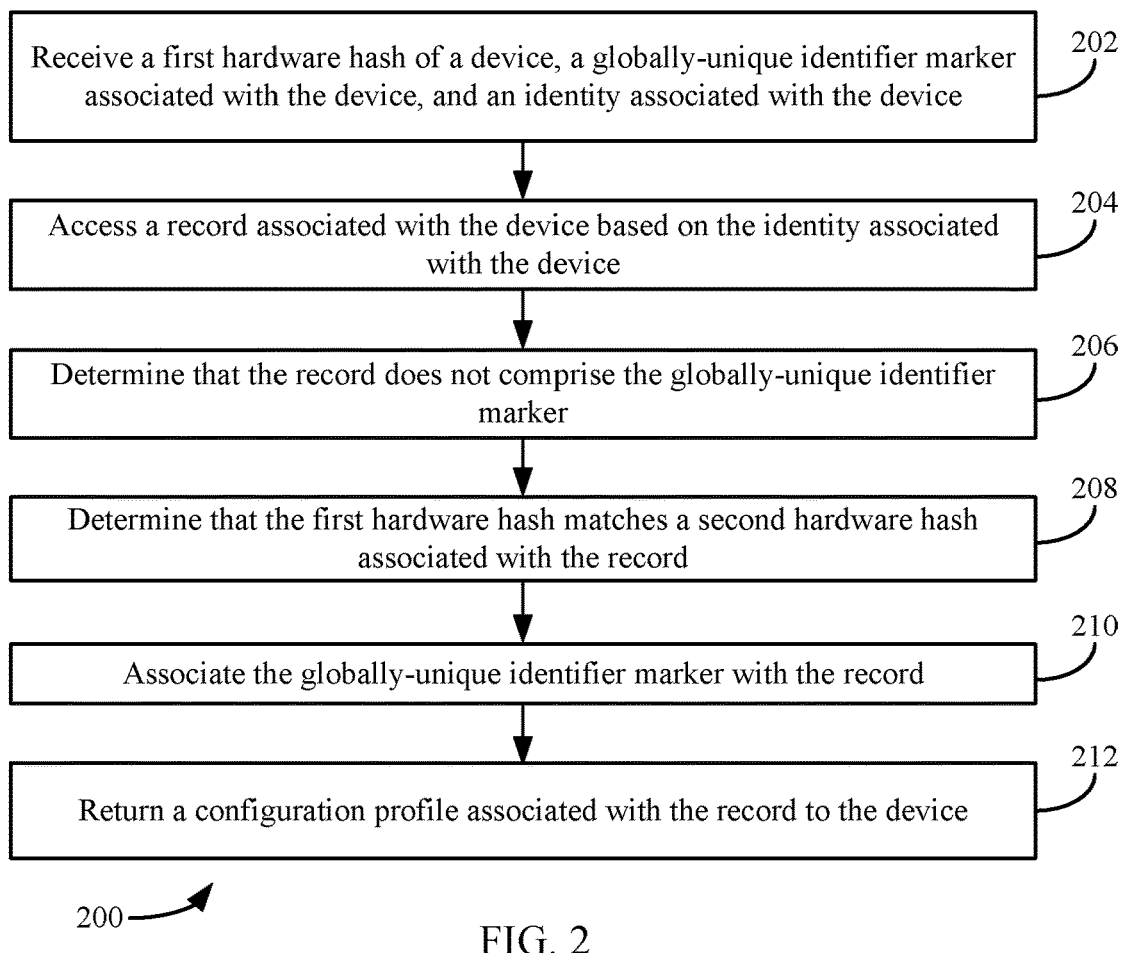

Receive a first hardware hash of a device, a globally-unique identifier marker associated with the device, and an identity associated with the device — 202

Access a record associated with the device based on the identity associated with the device — 204

Determine that the record does not comprise the globally-unique identifier marker — 206

Determine that the first hardware hash matches a second hardware hash associated with the record — 208

Associate the globally-unique identifier marker with the record — 210

Return a configuration profile associated with the record to the device — 212

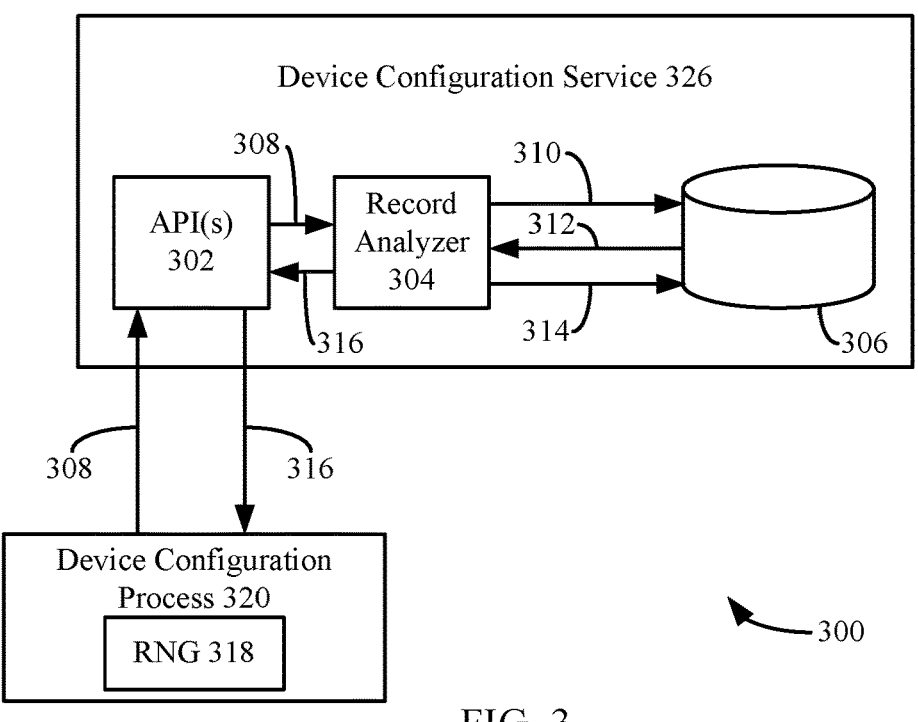

Device Configuration Service 326

308          310
API(s) 302    Record Analyzer 304    306
312
314
316

308    316

Device Configuration Process 320

RNG 318

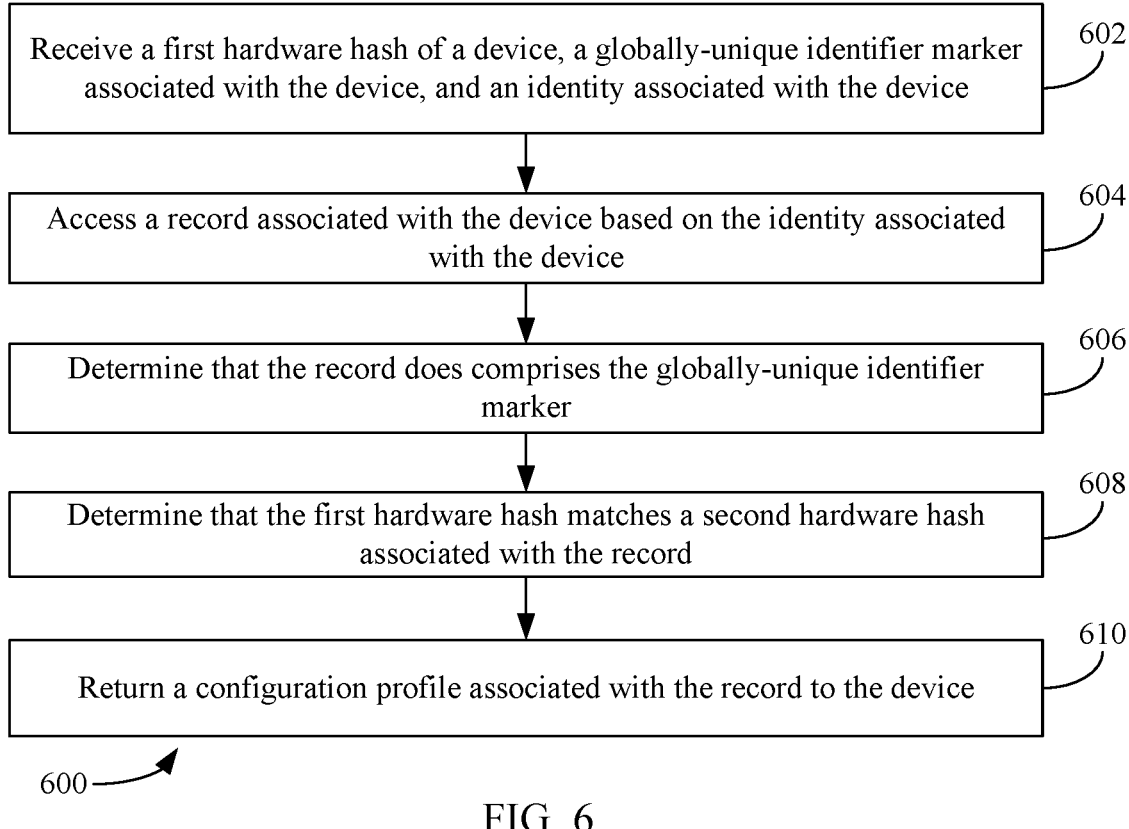

Receive a first hardware hash of a device, a globally-unique identifier marker associated with the device, and an identity associated with the device — 602

Access a record associated with the device based on the identity associated with the device — 604

Determine that the record does comprises the globally-unique identifier marker — 606

Determine that the first hardware hash matches a second hardware hash associated with the record — 608

Return a configuration profile associated with the record to the device — 610

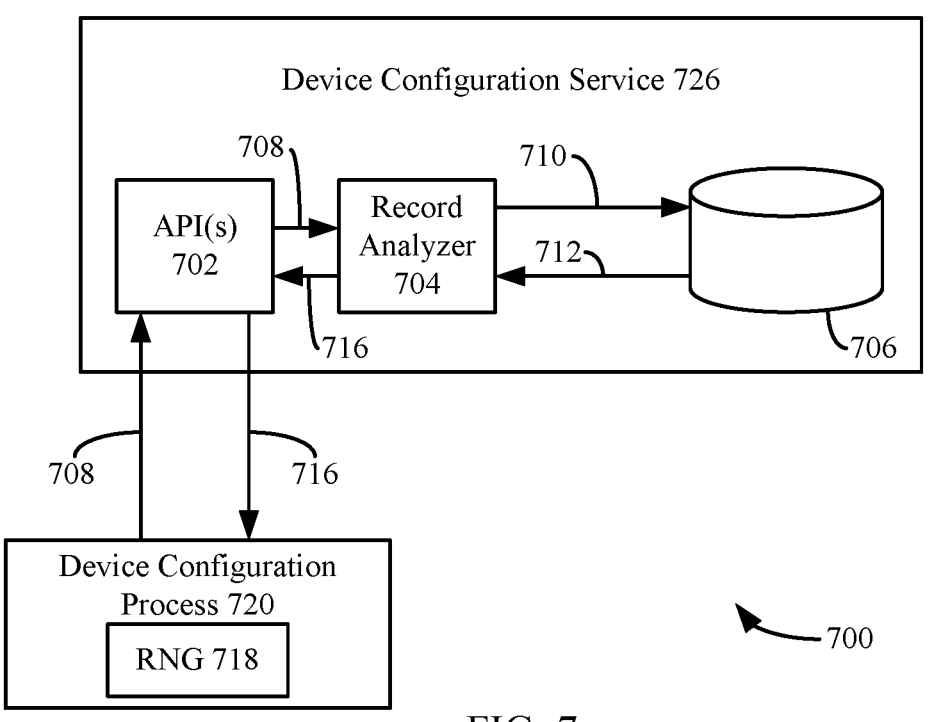

Device Configuration Service 726

708
710
API(s) 702
Record Analyzer 704
712
706
716

708        716

Device Configuration Process 720

RNG 718

HARDWARE IDENTITY RESTORATION POST-DEVICE REPAIR

CROSS-REFERENCE TO RELATED APPLICATION(S)

This application claims priority to U.S. Provisional Patent Application No. 63/320,025 entitled "HARDWARE IDEN-TITY RESTORATION POST-COMPUTING DEVICE REPAIR," and filed on Mar. 15, 2022, the entirety of which is incorporated by reference herein.

BACKGROUND

Device fingerprinting today relies on hardware components to be identified correctly. After a device, such as a laptop, is repaired, some of these key components may have been replaced, changing the hardware identity of the device. Additionally, if those components are reused in a different device, the fingerprint of this second device may be associated with the original device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein involve building upon a hardware identity of a device representing the physical traits of the device, and using it to match and detect hardware changes on the device by analyzing values that are normally treated as immutable and comparing them to identify poten-tial mismatches. At initialization, the device also generates a globally-unique identification (GUID) marker that persists across operating system (OS) reinstallations. On the device, there is a periodic routine that detects hardware mismatches by comparing the current identity of the device with a cached version, along with the GUID. Once a change is detected, the device sends a request to a service that stores a hint (e.g., the GUID) for a later secure restoration attempt. A remote service (e.g., a cloud-based service) then attempts to restore the hardware identity of the device upon next check-in via a secure transmission of the updated identity, as well as resolving conflicts in a device record maintained by the remote service.

BRIEF DESCRIPTION OF THE DRAWINGS/FIGURES

The accompanying drawings, which are incorporated herein and form a part of the specification, illustrate embodi-ments of the present application and, together with the description, further serve to explain the principles of the embodiments and to enable a person skilled in the pertinent art to make and use the embodiments.

FIG. 2 shows a flowchart for verifying the identity of a device in accordance with an embodiment.

FIG. 3 depicts a block diagram of a system configured to verify the identity of a device in accordance with an example embodiment.

FIG. 6 shows a flowchart for verifying the identity of a device in accordance with another embodiment.

FIG. 7 depicts a block diagram of a system configured to verify the identity of a device in accordance with an example embodiment

Figure 1:
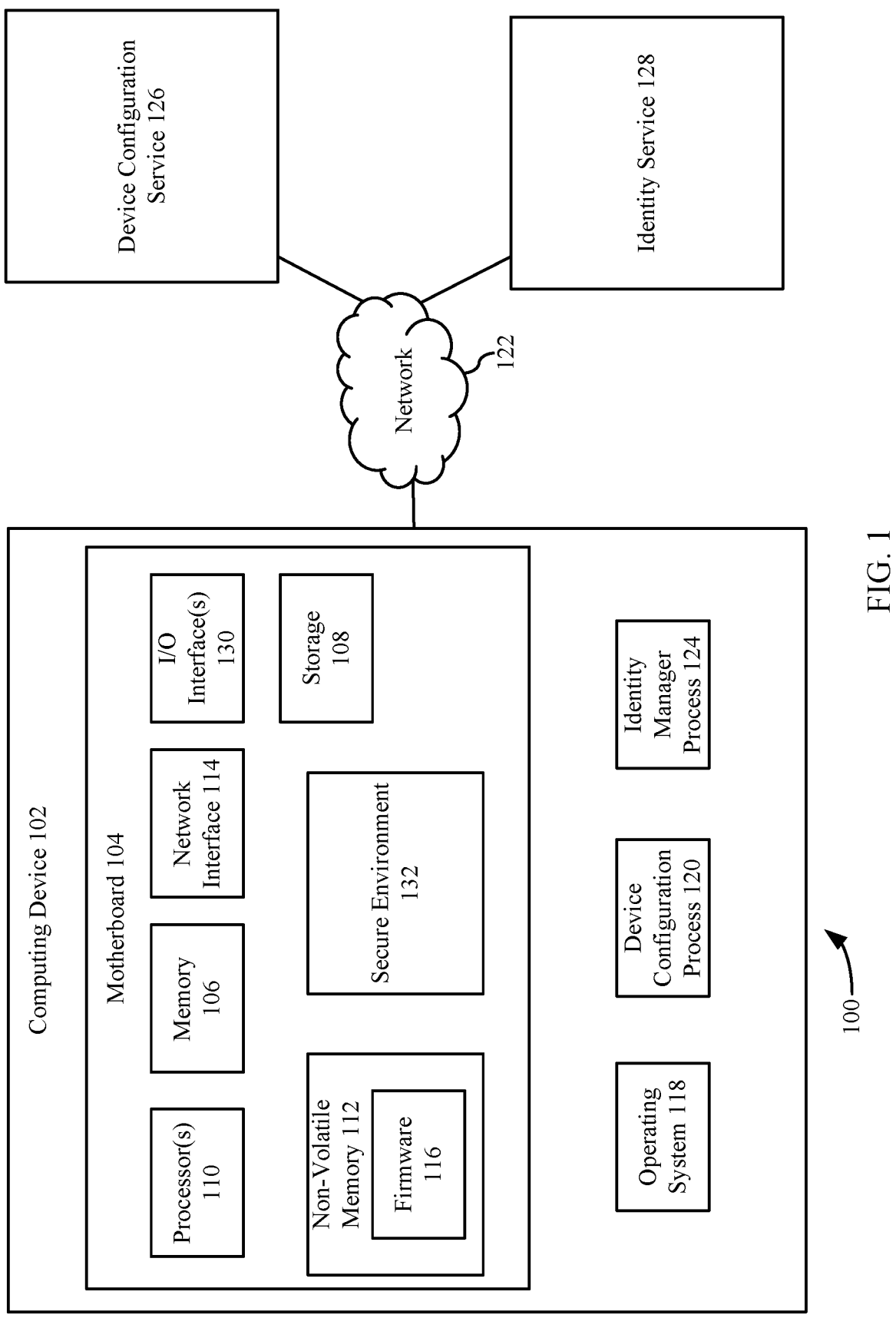
FIG. 1 shows a block diagram of an example system for restoring the hardware identity of a repaired device in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodi-ments, as well as modifications to the disclosed embodi-ments.

References in the specification to "one embodiment," "an embodiment," "an example embodiment," etc., indicate that the embodiment described may include a particular feature, structure, or characteristic, but every embodiment may not necessarily include the particular feature, structure, or char-acteristic. Moreover, such phrases are not necessarily refer-ring to the same embodiment. Further, when a particular feature, structure, or characteristic is described in connection with an embodiment, it is submitted that it is within the knowledge of one skilled in the art to effect such feature, structure, or characteristic in connection with other embodi-ments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous exemplary embodiments are described as fol-lows. It is noted that any section/subsection headings pro-vided herein are not intended to be limiting. Embodiments are described throughout this document, and any type of embodiment may be included under any section/subsection. Furthermore, embodiments disclosed in any section/subsec-tion may be combined with any other embodiments described in the same section/subsection and/or a different section/subsection in any manner.

II. Example Embodiments

Device fingerprinting today relies on hardware components to be identified correctly. However, after a device, such as a laptop is repaired, some of these key components may have been replaced, changing the hardware identity of the device. Additionally, if those components are reused in a different device, the fingerprint of this second device may be associated with the original device. Furthermore, the hardware matching heuristic may incorrectly identify multiple devices as the same shared identity.

The embodiments described herein involve building upon a hardware identity of a device representing the physical traits of the device, and using it to match and detect hardware changes on the device by analyzing values that are normally treated as immutable and comparing them to identify potential mismatches. At initialization, the device also generates a globally-unique identification (GUID) marker that persists across operating system (OS) reinstallations. On the device, there is a periodic routine that detects hardware mismatches by comparing the current identity of the device with a cached version, along with the GUID. Once a change is detected, the device sends a request to a service that stores a hint (e.g., the GUID) for a later secure restoration attempt. A remote service (e.g., a cloud-based service) then attempts to restore the hardware identity of the device upon next check-in via a secure transmission of the updated identity, as well as resolving conflicts in a device record maintained by the remote service.

Currently, there is no technical solution for detecting and then updating a hardware identity when a large repair operation occurs, where multiple components are replaced. The embodiments described herein are configured to detect these changes, decouple the original hardware components, and to key off of process changes allowing repair facilities to trigger the hardware identity restoration process. Such techniques provide a technical advantage, where the new device has the same hardware identity as the old device, and the old components are no longer associated with the repaired device. Another technical advantage is that failures in the hardware matching heuristic may be detected. Detected collisions can then be resolved resulting in distinct identities.

In addition, the techniques described advantageously ensure that repaired devices continue to receive targeted policies correctly, as well as reduces security or privacy concerns by ensuring devices that were repaired with the original hardware components do not continue to receive the original company's targeted policies. In addition, a new user that physically possesses a refurbished device may receive content (e.g., certain graphical user interface (GUI) screens of an out-of-box experience (OOBE)) that is not intended for them. Such GUI screens may identify the name of the previous user of the device and/or identify an organization at which the previous user works.

FIG. 1 shows a block diagram of an example system 100 for restoring the hardware identity of a repaired device, according to an example embodiment. As shown in FIG. 1, system 100 may include a computing device 102, a device configuration service 126, and an identity service 128, although the embodiments described herein are not so limited. Computing device 102, device configuration service 126, and identity service 128 may be communicatively coupled via a network 122. Network 122 may comprise one or more networks such as local area networks (LANs), wide area networks (WANs), enterprise networks, the Internet, etc., and may include one or more of wired and/or wireless portions. Device configuration service 126 and identity service 128 may be implemented on different computing devices, such as a server, or alternatively, may be implemented on the same computing device. In embodiments, each of device configuration service 126 and/or identity service 128 may be implemented via cloud-based servers incorporated in a cloud computing platform, such as the Microsoft® Azure® cloud computing platform, owned by Microsoft Corporation of Redmond.

Computing device 102 may comprise a motherboard 104 (also referred to as a baseboard or main circuit board) to which various components of computing device 102 may be attached. For instance, motherboard 104 may comprise, among other things, one or more processor(s) ("processor") 110, one or more memories ("memory") 106, one or more network interfaces ("network interface") 114, one or more input/output (I/O) interfaces 130, one or more storage devices ("storage") 108, one or more non-volatile memories ("non-volatile memory") 112, and/or a secure environment 132. Computing device 102 and/or motherboard 104 may also include additional components (not shown for brevity and illustrative clarity) including, but not limited to, components and subcomponents of other devices and/or systems herein, as well as those described below with respect to FIGS. 4 and 5.

Processor 110 may be any type of processor circuit that is described herein, and/or as would be understood by a person of skill in the relevant art(s) having the benefit of this disclosure. Processor 110 may comprise one or more processors or processor cores, different types of processors, remote processors, and/or distributed processors. Processor 110 comprises circuitry that is configured to execute computer program instructions such as but not limited to embodiments of an operating system 118, a device configuration process 120, and/or an identity manager processor 124 (as respectively described below), which may be implemented as computer program instructions for performing various operations and/or functions as described herein.

Memory 106 may comprise one or more volatile memory devices as would be understood by a person of skill in the relevant art(s) having the benefit of this disclosure. Memory 106 is configured to store computer program instructions/code, such as but not limited to embodiments of operating system 118, device configuration process 120, and/or identity manager processor 124, as well as to store other information and data described in this disclosure including. Examples of memory 106 include, but are not limited to, dynamic random access memory (DRAM), synchronous DRAM (SDRAM), video RAM (VRAM), double data rate-based RAM (e.g., DDR-SDRAM), small outline (SO)-based RAM, and/or the like.

Network interface 114 may be any type or number of wired and/or wireless network adapter, modem, etc., configured to enable computing device 102 to communicate with other devices over a network, such as communications between computing device 102 and other devices utilized in a network as described herein over a network (e.g., device configuration service 126 and/or identity service 128).

I/O interface(s) 130 may comprise hardware (e.g., I/O slots, controllers, ports, etc.) and/or software and may support any number of input devices and instruments such as a mouse, a microphone, a camera, a kinetic sensor, a physical keyboard, a trackball, virtual reality eyewear, gloves, other wearables or sensors, etc., and/or the like, one or more output devices such as a speaker, a display screen, and/or the like, and/or one or more peripheral devices (e.g., a video card, a hard drive, a solid state drive, a network card, etc.). Additional I/O devices supported by I/O interface(s) 130 are described below with respect to FIGS. 4 and 5.

Storage 108 may comprise one or more physical storage devices as would be understood by a person of skill in the relevant art(s) having the benefit of this disclosure. Examples of storage 108 include, but are not limited to, one or more hard drives, one or more solid state drives, etc. Additional examples of physical storage devices are described below with respect to FIGS. 4 and 5.

Secure environment 132 may comprise a trusted platform module (TPM), a hardware security module (HSM), or any type of secure hardware and/or software-based cryptoprocessor.

Non-volatile memory 112 may be comprise one or more non-volatile memory devices as would be understood by a person of skill in the relevant art(s) having the benefit of this disclosure. Non-volatile memory 112 is configured to store boot code and/or various types of firmware 116. The boot code comprises code (or instructions) that are executable by processor(s) 110 during a boot session (i.e., when computing device 102 is starting up after being powered on or reset). Examples of firmware 116 include, but are not limited to, basic input/output system (BIOS) firmware, UEFI (unified extensible firmware interface)-based firmware, and various device-specific firmware, such as hard disk drive firmware, solid state drive firmware, video BIOS firmware, etc. It is noted that firmware 116 is representative of these various types of firmware (i.e., firmware 116 may represent more than one type of firmware). Examples of non-volatile memory 112 include, but are not limited to, a non-volatile read-only memory device (e.g., flash memory, erasable programmable read-only memory (EPROM), an electrically erasable programmable read-only memory (EEPROM), and/or the like).

Operating system 118 may manage one or more hardware components (e.g., processor(s) 110, memory 106, network interface 114, I/O interface(s) 130, non-volatile memory 112, storage 108, etc.). Certain aspects of operating system 118 may be stored in memory 106 and/or storage 108 and may be executed by processor(s) 110. An example of operating system 118 includes, but is not limited to, the MICROSOFT® WINDOWS® Operating System (OS), published by Microsoft Corporation of Redmond, Washington.

Device configuration process 120 may be configured to set up, pre-configure, reset and/or re-purpose computing devices (e.g., computing device 102) (e.g., when they are booted for the first time after being provisioned). For example, device configuration process 120 may automatically communicate with a remote server (e.g., device configuration service 126) to enroll computing device 102 with a mobile device manager (MDM), obtain settings to be implemented by computing device 102, etc. An example of device configuration process 120 includes, but is not limited to, WINDOWS® Autopilot™ published by Microsoft Corporation.

Identity manager process 124 is configured to obtain a device identification (ID) of computing device 102, for example, from identity service 128. Identity service 128 may be configured to generate a device ID for computing device 102 after computing device 102 is enrolled with identity manager process 124 and/or a device account is established therewith. The device ID may be generated by identity service 128 based on various identifiers associated with computing device 102. For instance, upon enrollment with identity service 128, computing device 102 may provide one or more identifiers of one or more hardware components thereof. Examples of hardware components include, but are not limited to, CD-ROM drives, DVD-ROM drives, BLU-RAY drives, network cards, processor(s) 110, memory 106, display adapters, network adaptors, etc. Examples of identifiers include, but are not limited to, serial numbers, media access control numbers, device identifiers, and/or any identifier that uniquely identifies such hardware components. Identity service 128 may be configured to generate a hash based on such hardware identifiers and designate the hash as the device ID for computing device 102. An example of a device account includes, but is not limited to, a Microsoft Account (MSA) (previously referred to as a Windows Live ID). An example of identity service 128 includes, but is not limited to Microsoft® Intune™ published by Microsoft Corp.

Each of device configuration process 120 and identity manager process 124 may be a software application or may be incorporated as part of operating system 118. Additional details regarding device configuration process 102, identity manager process 124, device configuration service 126, and identity service 128 are provided below.

An organization, such as a business, may purchase a plurality of computing devices from an authorized original equipment manufacturer (OEM). The OEM may obtain a hardware identity or fingerprint for each the purchased devices. The fingerprint for a particular device may be based on identifiers of one or more components of the device, including, but not limited to, a motherboard serial number, a product key identifier, the manufacturer make (e.g., brand) and model of computing device 102, a public key of an endorsement key of a secure environment (e.g., secure environment 132), etc. The endorsement key is an asymmetric key contained inside the secure environment (injected at manufacturing time). The endorsement key is unique for each secure environment and can identify it. The endorsement key cannot be changed or removed. The OEM may utilize a software-based tool that executes on each of the purchased devices and that is configured to gather the above-described identifiers of a respective device.

The OEM may provide the fingerprints obtained for the purchased devices to an operating system provider in order to purchase a license from the provider. The OEM may also specify to the provider that the purchased devices are being assigned to the organization that purchases the devices. The OEM may have direct application programming interface (API) integration into the provider's back end. For instance, the OEM may issue one or more API calls to identity service 128. The API call(s) may comprise the hardware identities obtained for the purchased computing devices and/or an identifier of the organization to which the devices are being assigned. Identity service 128, responsive to receiving the API call(s), may store the hardware identities and/or organization identifiers for the purchased devices.

When a user of a particular purchased computing device (e.g., computing device 102) powers on the computing device for the first time, the device boots into operating system 118 and device configuration process 120 is initiated. Device configuration process 120 may, after computing device 102 has obtained a network connection, provide a command to identity manager process 124 that causes identity manager process 124 to obtain the hardware fingerprint of computing device 102, for example by querying various hardware component-related drivers installed on computing device 102. The hardware fingerprint may comprise the above-described hardware identifiers. Identity manager process 124 may provide a query to identity service 128 comprising the hardware fingerprint of computing device 102.

Identity service 128 is configured to determine whether a record of computing device 102 exists, thereby utilizing the hardware fingerprint (also referred to as a device identifier). For instance, identity service 128 may compare the hardware fingerprint received from computing device 102 to the hardware fingerprints maintained thereby. Each of the hardware fingerprints maintained by identity service 128 may be stored in a respective record of a database maintained by identity service 128. If a match is found, then identity service 128 returns the matched device identifier associated with computing device 102 to identity manager process 124. If no match is found, then identity service 128 may generate a random identifier (i.e., a randomly-generated identifier) for computing device 102, and generate a new record that associates the random identifier with computing device 102. The random identifier may be returned to identity manager process 124 of computing device 102. In accordance with an embodiment, the identifier returned (either the matched identifier or the random identifier) may be referred to as an identity ticket, which is a container that includes the identifier. In accordance with an embodiment, the container may be a SOAP (simple object access protocol) envelope that comprises a token that specifies the identifier. The identifier may be referred to as a durable device identifier (DDID). The identity ticket may be provided to device configuration process 120.

Device configuration process 120 may provide a query specifying the identity ticket to device configuration service 126. Device configuration service 126 is configured to determine a profile associated with the identity and provide the profile to device configuration process 120. The profile may specify a setup sequence that is to be performed by operating system 118 based on the identity. The setup sequence may be referred to as an out-of-box experience (OOBE) in which operating system 118 guides the user through a series of graphical user interface (GUI) screens that assist the user to setup computing device 102. For instance, the GUI screens may enable the user to provide account information/credentials (e.g., associated with the organization to which the user belongs), select a preferred language, select preferred keyboard settings, setup a virtual assistant, accept licensing agreements or terms of service, set up networking options, etc. The GUI screens that are displayed to the user may be specific to the identity associated with computing device 102. Thus, one identity may be associated with a first of GUI screens, whereas another identity may be associated with a second set of GUI screens that is different than the first set.

After setup is complete via the GUI screens, device configuration process 120 may register computing device 102 with an MDM. After registration, the MDM may provide one or more configuration settings specific to the organization to which computing device 102 is associated. Examples of configuration settings include, but are not limited to, one or more encryption settings to be implemented by computing device 102, one or more security settings to be implemented by computing device 102, a minimum version of at least one of an application or operating system 118 required to be installed on computing device 102, etc. The encryption setting(s) may specify whether a storage device included in computing device 104 is to be encrypted (e.g., via an encryption program, such as, but not limited to BitLocker™). The security setting(s) may specify a password policy to be implemented by computing device 102 (e.g., setting the password length to a minimum of 10 characters, 12 characters, etc.), whether code signing should be implemented by computing device 102, whether secure environment 132 should be implemented by computing device 102, etc. It is noted that the configuration settings described above are purely exemplary and that other configuration settings may be used.

In the event that a certain hardware component of motherboard 104 (e.g., a universal serial bus (USB) port, a power port, etc.) of computing device 102 becomes defective, the user may have computing device 102 repaired. Computing device 102 would be shipped to the OEM. Often times, rather than repairing the component itself, the OEM will simply replace motherboard 104 with a new motherboard, thereby causing computing device 102 to have a new hardware fingerprint.

When computing device 102 is reset and device configuration process 120 is re-initiated, device configuration process 120 causes identity manger process 124 to obtain the identity of computing device 102 as described above. However, identity manager process 124 now provides a different hardware fingerprint due to the change in hardware component(s). When identity service 128 attempts to match this new hardware fingerprint to the fingerprints maintained thereby, either identity service 128 may return an identity of another device that originally included the motherboard that is now in computing device 102, or, in the event that no match is found, will return a random identifier. When device configuration process 120 provides the returned identity to device configuration service 126, device configuration process 120 may provide a profile associated with another device to device configuration process 120 of computing device 102.

This may cause data security and/or data privacy issues as the user who now physically possesses computing device 102 may receive content (e.g., certain GUI screens of the OOBE) that is not intended for them. For example, such GUI screens may identify the name of the user associated with the received profile (and not the user of computing device 102) and/or identify an organization at which the user associated with the received profile works.

There are various cases in which certain issues may occur. For example, such a scenario may occur (1) when a computing device is resold without deregistration with device configuration service 126, thereby resulting in the new owner getting content intended for a previous owner; (2) during hardware component repair, which results in a computing device not obtaining a proper profile from device configuration service 126; (3) when a hardware component of a computing device is repaired by reusing an component from another computing device, thereby resulting in the repaired device getting content intended for the old device; and (4) when a hardware component of a computing device is repaired by reusing an component from another computing device, thereby resulting in both the old and new devices getting content intended for the old device.

The embodiments described herein are directed to remediation techniques for such issues. Subsection A described embodiments directed to post-reset remediation. Subsection B describes embodiments directed to pre-reset remediation.

A. Post-Reset Remediation

This remediation occurs after computing device 102 has hardware components changed and operating system 118 is reset such that computing device 102 is restored to its original factory settings. For instance, motherboard 104 is replaced with a new motherboard and operating system 118 may be reinstalled on computing device 102. This type of remediation has at least two cases: a) the first time a profile download attempt from device configuration service 126 is attempted by device configuration process 120; and b) subsequent profile download attempts from device configuration service 126 are attempted by device configuration process 120. The first case is described as follows.

When computing device 102 is turned on, boots into operating system 118, and obtains a network connection, device configuration process 120 is initiated. Device configuration process 120 provides a command to identity manager process 124 that causes identity manager process 124 to obtain the hardware fingerprint of computing device 102. For instance, identity manager process 124 may obtain the serial number of the new motherboard of computing device 102, a product key identifier, the manufacturer make and model of computing device 102, and a public key of an endorsement key of secure environment 132. Identity manager process 124 may provide a query to identity service 128 comprising the hardware fingerprint of computing device 102.

As described above, identity service 128 is configured to determine whether a record of computing device 102 exists thereby utilizing the hardware fingerprint. If a match is found, then identity service 128 returns an identity ticket associated with computing device 102 to identity manager process 124. If no match is found, then identity service 128 may generate a random identifier (i.e., a randomly-generated identifier) for computing device 102, and generate a new record that associates the random identifier with computing device 102. An identity ticket comprising the random identifier may be returned to identity manager process 124 of computing device 102. Identity manager process 124 provides the received identity ticket to device configuration process 120.

Device configuration process 120 and/or identity manager process 124 may be configured to obtain additional hardware identifiers, such as, but not limited to, media access control numbers of network cards installed in computing device 102, a universal unique ID number (UUID) associated with the system management basic input/output system (SMBIOS) of computing device 102, identifier(s) of storage device(s) included in computing device 102, a serial number of the chassis of computing device 102, identifiers of a CD-ROM drive, a DVD-ROM drive, a BLU-RAY drive, processors, memories (e.g., random access memories (RAMs), non-volatile RAMs), display adapters, included in computing device 102. Examples of identifiers include, but are not limited to, serial numbers, media access control numbers, device identifiers, and/or any identifier that uniquely identifies such components. These additional hardware identifiers are referred herein as a hardware hash. Device configuration process 120 and/or identity manager process 124 may be configured to obtain the hardware hash for computing device 102 each time computing device 102 is reset such that computing device 102 is restored to its original factory settings.

Device configuration process 120 may also be configured to generate a globally-unique ID (GUID). For instance, device configuration process 120 may comprise a random number generator that is configured to generate the GUID. The GUID may comprise an n-bit hexadecimal number, where n may be 16-bit, 64-bit, 128-bit, etc., that is unique with respect to all other GUIDs stored and/or maintained by device configuration service 126. Device configuration process 120 may include the GUID as part of firmware 116 stored in non-volatile memory 112. Device configuration process 120 may only generate the GUID if no GUID was previously-generated by device configuration process 120. For instance, post-reset, device configuration process 120 may initially be configured to query firmware 116 to determine whether a GUID has already been specified and/or stored thereby. If a GUID has not been included in firmware 116, then device configuration process 120 generates the GUID.

Device configuration process 120 may provide the hardware hash, the identity ticket (comprising the DDID), and the GUID to device configuration service 126. As described above, device configuration service 126 is configured to determine a profile associated with the identity specified by the identity ticket and provide the profile to identity manager process 124. If a record comprising the profile is found, for example, by utilizing the DDID, then device configuration process 120 determines whether it already stores the GUID provided by device configuration process 120. Because this is the first time device configuration process 120 has requested a profile from device configuration service 126, device configuration service 126 has no record of the GUID and therefore no GUID match has occurred. In such a case, device configuration process 120 determines whether the hardware hash transmitted by device configuration process 120 matches a hardware hash stored by device configuration service 126. The hardware hash stored by device configuration service 126 may be obtained by the OEM (e.g., after the device is repaired) and stored by the OEM using, for example, API(s) provided via device configuration service 126. For instance, after the OEM repairs computing device 102, the OEM may gather all the hardware identifiers that comprise the hardware hash and store the hardware hash for computing device 102 via API(s) provided via device configuration service 126. Device configuration service 126 associates the hardware hash with the DDID of computing device 102.

If device configuration service 126 determines that the hardware hash stored thereby matches the hardware hash transmitted by device configuration process 120, then device configuration service 126 returns the profile associated with the DDID to device configuration service 126. As described above, the profile may specify a setup sequence that is to be performed by operating system 118 based on the identity. Accordingly, computing device 102 is provided the proper profile that is actually associated with the user of computing device 102 and not associated with some other computing device or user thereof.

It is noted that the embodiments described herein are also applicable for other types of devices other than computing devices. For instance, the embodiments described herein may also be utilized for other types of devices such as, but not limited to, electronic devices and/or home appliances (e.g., a television, a Blu-ray player, video game consoles, a set-top box, an audio/video receiver, a camera, a camcorder, a mixer, a grinder, a washing machine, a dryer, a vacuum, a microwave oven, a stove, a fan, a lamp, an air conditioner, a refrigerator, etc.), vehicles, Internet-of-Things (IoT) devices, medical devices, remote-controlled devices (e.g., drones, etc.), acoustic devices (e.g., loudspeakers), wearable devices (e.g., watches, smart watches, wearable medical devices (e.g., insulin pumps, pacemakers, glucose monitors, etc.), smart glasses, etc.), or any other physical device that comprises hardware components therein that may be repaired. In accordance with such embodiments, the hardware hash, the GUID, and/or identity ticket of such devices may be stored in a memory (e.g., a read-only memory) included therein or coupled thereto (e.g. via a Universal Serial Bus (USB)-based memory device, a memory card (such as a flash memory card, a secure digital (SD) memory card, etc.)), encoded via a machine-readable format (e.g., via a linear or one-dimensional barcode, a quick response (QR) code, a tag device, etc.) which may be attached to, affixed to, or otherwise associated with the device.

Accordingly, the identity of a device may be verified after the device is repaired in many ways. For example, FIG. 2 shows a flowchart 200 for verifying the identity of a device, according to an example embodiment. In an embodiment, flowchart 200 may be implemented by system 300, as shown in FIG. 3. FIG. 3 depicts a block diagram of a system 300 configured to verify the identity of a device in accordance with an example embodiment. As shown in FIG. 3, system 300 comprises a device configuration process 320 and a device configuration service 326. Device configuration process 320 and device configuration service 326 are examples of device configuration process 120 and device configuration service 126, as respectively described above with reference to FIG. 1. As further shown in FIG. 3, device configuration service 326 may comprise one or more application programming interfaces (APIs) 302, a record analyzer 304 and/or a database 306. Database 306 is configured to store a plurality of records, each associated with a respective device (e.g., computing device 102, as described above with reference to FIG. 1). It is noted that while database 306 is shown as being included as part of device configuration service 326, the embodiments described are not so limited and that database 306 may be communicatively coupled to device configuration service 326 via network(s) (e.g., network(s) 122, as described above with reference to FIG. 1). Other structural and operational embodiments will be apparent to persons skilled in the relevant art(s) based on the following discussion regarding flowchart 200 and system 300 of FIG. 3.

Flowchart 200 begins with step 202. In step 202, a first hardware hash of a device, a GUID associated with the device, and an identity associated with the device is received. For example, with reference to FIG. 3, an API of API(s) 302 configured to receive messages from device configuration process 320 may receive a message 308 from device configuration process 320. Message 308 may comprise a first hardware hash of a device on which device configuration process 320 executes (e.g., computing device 102), a GUID associated with the device, and an identity associated with the device. The API of API(s) 302 may provide message 308 to record analyzer 304

In accordance with one or more embodiments, the GUID is a randomly-generated identifier. For example, with reference to FIG. 3, device configuration process 320 may comprise a random number generator 318. Random number generator 318 is configured to randomly-generate an identifier that is utilized as the GUID.

In accordance with one or more embodiments, the first hardware hash is based at least at one of a serial number of a motherboard (e.g., motherboard 104) of the device (e.g., computing device 102), a product key identifier associated with the device, at least one of a brand or model of the device, or a public key associated with a secure environment (e.g., a public key of the endorsement key (EKpub) of secure environment 132) of the device.

In step 204, a record associated with the device is accessed based on the identity associated with the device. For example, with reference to FIG. 3, record analyzer 304 of device configuration service 326 may provide a query 310 to database 306 to access a record associated with the device (e.g., computing device 102) based on the identity. For instance, query 310 may specify the identity.

In step 206, a determination is made that the record does not comprise the GUID. For example, with reference to FIG. 3, database 306 may return the record via a response 312. Record analyzer 304 analyzes the record to determine that the record does not comprise the GUID.

In step 208, responsive to determining that the record does not comprise the globally-unique identifier marker, a determination is made that the first hardware hash matches a second hardware hash associated with the record. For example, with reference to FIG. 3, record analyzer 312 analyzes the record and determines that the first hardware hash matches a second hardware hash associated with the record. Additional details regarding associating a second hardware hash with the record is described below with reference to FIGS. 4-5.

In step 210, responsive to determining that the first hardware hash matches the second hardware hash associated with the record, the GUID is associated with the record. For example, with reference to FIG. 3, record analyzer 304 may issue a command 314 to database 306 that causes the GUID that was included in message 308 to be associated with the record.

In step 212, a configuration profile associated with the record is returned to the device. For example, with reference to FIG. 3, record analyzer 304 may generate a message 316 that comprises the configuration profile and provides message 316 to an API of API(s) 302 configured to provide messages to device configuration process 320. The API provides message 316 comprising the configuration profile associated with the record to device configuration process 320.

In accordance with one or more embodiments, the configuration profile specifies a setup sequence performed by an operating system of the device that is specific to the identity associated with the device.

In accordance with one or more embodiments, the setup sequence comprises one or more graphical user interface screens that enable a user of the device to configure one or more settings of the device that are specific to the identity associated with the device.

Figure 4:
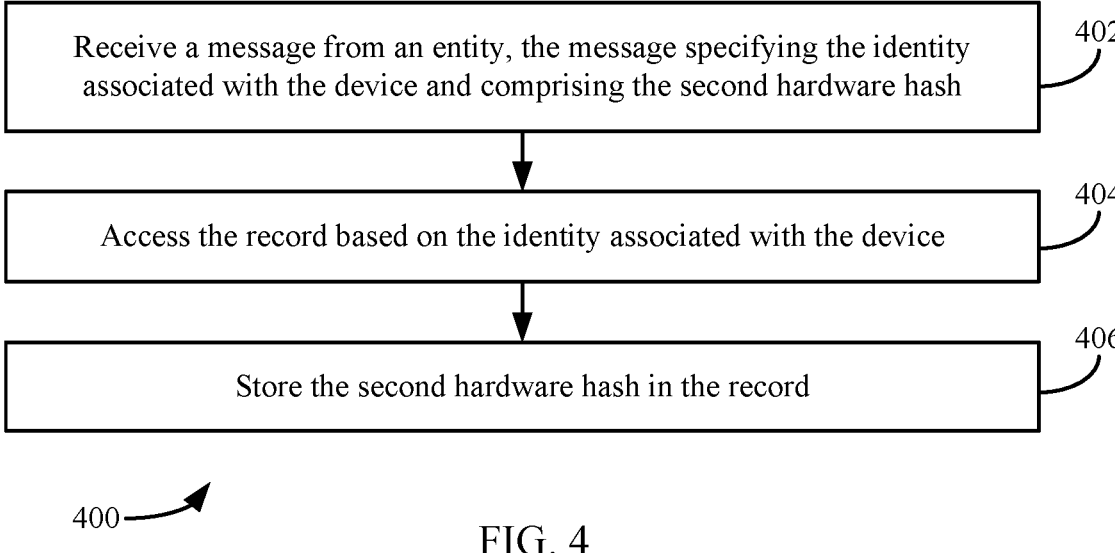
FIG. 4 shows a flowchart for associating a hardware hash with a record, according to an example embodiment.
Figure 5:
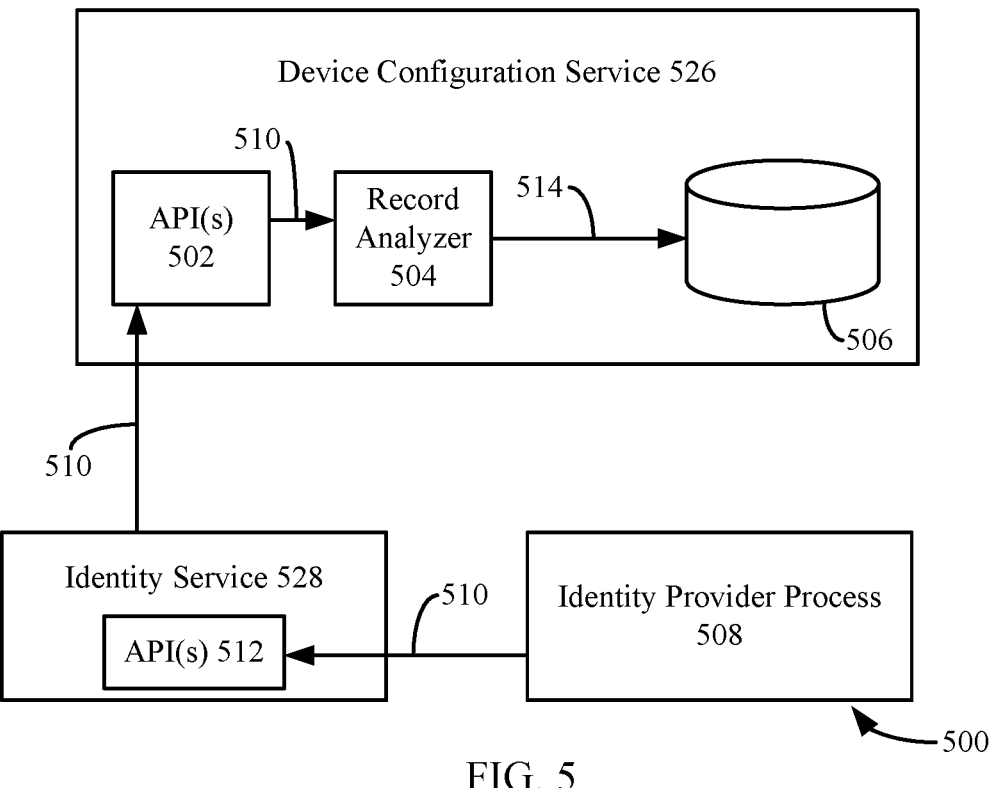
FIG. 5 depicts a block diagram of a system configured to associate a hardware hash with a record in accordance with an example embodiment.

For example, FIG. 4 shows a flowchart 400 for associating a hardware hash with a record, according to an example embodiment. In an embodiment, flowchart 400 may be implemented by system 500, as shown in FIG. 5. FIG. 5 depicts a block diagram of a system 500 configured to associate a hardware hash with a record in accordance with an example embodiment. As shown in FIG. 5, system 500 comprises an identity service 528, an identity provider process 508, and a device configuration service 526. Device configuration service 526 is an example of device configuration service 326, as described above with reference to FIG. 3. Identity service 528 is an example of identity service 128, as described above with reference to FIG. 1. Identity provider process 508 may be a process executing on a device with an entity (e.g., an OEM) that repairs a device (e.g., computing device 102) on which device configuration service 526 executes. Device configuration service 526 may comprise API(s) 502, a record analyzer 504, and a database 506, which are examples of API(s) 302, record analyzer 304, and database 306, as respectively described above with reference to FIG. 3. Other structural and operational embodiments will be apparent to persons skilled in the relevant art(s) based on the following discussion regarding flowchart 400 and system 500 of FIG. 5.

Flowchart 400 begins with step 402. In step 402, a message is received from an entity, the message specifying the identity associated with the device and comprising the second hardware hash. For example, with reference to FIG. 5, identity provider process 508 may obtain a device identifier and a hardware hash of the device (e.g., computing device 102) while it is in possession of the entity. Identity provider process 508 may provide a message 510 to an API of API(s) 512 of identity service 520 that is configured to receive messages from identity provider process 508. Message 510 comprises the device identifier and the hardware hash of the device. Identity service 528 may provide a message 510 to an API of API(s) 502 configured to receive messages from identity service 528. Message 510 may comprise the device identifier and the hardware hash of the device. The API of API(s) 502 provides message 510 to record analyzer 504.

In accordance with one or more embodiments, the device is a repaired device.

In step 404, the record is access based on the identity associated with the device. For example, with reference to FIG. 5, record analyzer 504 may issue a query 514 to database 506 that stores the record. Query 514 may specify the hardware identity, which is utilized to access the record.

In step 406, the second hardware hash is stored in the record. For example, with reference to FIG. 5, query 514 causes the hardware hash received via message 514 to be stored in the record maintained by database 506.

Referring again to FIG. 1, when a subsequent profile download is attempted, the GUID is already stored by device configuration service 126. When computing device 102 is turned on, boots into operating system 118, and obtains a network connection, device configuration process 120 is initiated. Device configuration process 120 may determine a hardware hash of computing device 102 and provides a command to identity manager process 124 that causes identity manager process 124 to obtain the hardware fingerprint of computing device 102. For instance, identity manager process 124 may obtain the serial number of the new motherboard of computing device 102, a product key identifier, the manufacturer make and model of computing device 102, and a public key of an endorsement key of secure environment 132. Identity manager process 124 may provide a query to identity service 128 comprising the hardware fingerprint of computing device 102.

As described above, identity service 128 is configured to return an identity ticket based on the hardware fingerprint associated with computing device 102 to identity manager process 124. Identity manager process 124 provides the received identity ticket to device configuration process 120.

Device configuration process 120 is configured to retrieve the GUID from firmware 116 and provide the GUID, the hardware hash, and the identity ticket to device configuration service 126. As described above, device configuration service 126 is configured to determine a profile associated with the identity specified by the identity ticket and provide the profile to identity manager process 124. If a record comprising the profile is found, for example, by utilizing the DDID, then configuration service 126 determines whether it already stores the GUID provided by device configuration process 120. Because this is not the first time device configuration process 120 has requested a profile from device configuration service 126, device configuration service 126 already stores the GUID, which was obtained from device configuration process 120 during the first profile download attempt, as described above. Device configuration service 126 matches the GUID provided by device configuration process 120 to the GUID stored in the recorded identified via the DDID. Upon matching the GUID, device configuration service 126 determines whether the hardware hash transmitted by device configuration process 120 matches the hardware hash stored by device configuration service 126. As described above, the hardware hash stored by device configuration service 126 may be obtained by the OEM (e.g., after the device is repaired) and stored by the OEM using, for example, API(s) provided via device configuration service 126.

If device configuration service 126 determines that the hardware hash stored thereby matches the hardware hash transmitted by device configuration process 120, then device configuration service 126 returns the profile associated with the DDID to device configuration service 126. Accordingly, computing device 102 is provided the proper profile that is actually associated with the user of computing device 102 and not associated with some other computing device or user thereof.

If the GUID marker comparison does not result in a match (in either scenario described above), device configuration service 126 may return an empty profile to device configuration process 120. The empty profile may comprise an extra field indicating mismatched markers. The empty profile is saved on computing device 102, and the extra field can serve as helpful diagnostic data. The empty profile will cause computing device 102 to go through a normal (or default) OOBE as if it were not registered with device configuration service 126. In addition, the following may also occur if a device configuration service 126 detects a GUID marker mismatch: 1) device configuration service 126 marks a record associated with computing device 102 as requiring remediation, which effectively means computing device 102 behaves as if it were unregistered—except that a record is kept around with dynamic grouping intact; 2) the MDM syncs the device remediation status; and 3) the MDM displays the device's remediation status via a list and returns the status via graph APIs as well.

At this point, an IT (information technology) administrator (admin) can detect the impacted device via a portal UX (user experience) or via automation. Fixing an impacted device requires re-uploading the hardware hash to device configuration service 126. For post-reset, the IT admin will need to collect the hardware hash from the impacted device and re-register the device. Since the device is not active via the MDM, the device can easily be deleted and re-registered.

Secure hardware hash collection techniques may be utilized, including One-Time-Code type solutions, companion application co-authentication and upload, and direct Enterprise Provisioning steps in OOBE, where the hardware hash is collected to a USB drive and mailed to the IT admin.

After restoration of a device's registration with device configuration service 126, when the device next goes through OOBE again, it will go through the first scenario as described (i.e., where a profile download attempt occurs for the first time).

It is noted that the GUID adds an additional verification check in scenarios where a computing device is repurposed for another organization. In such a scenario, the devices may be first returned to the OEM. The OEM may clean up the devices, format the devices, reinstall the operating system on the devices, and send the devices to the new organization. As part of the cleanup process, the OEM may delete the GUID. This will cause the GUID to be regenerated by device configuration process 120. The new GUID will act as an indicator to device configuration service 126 that the computing device has gone through refurbishment or repurposing, thereby preventing device configuration service 126 from sending the computing device the wrong profile.

Accordingly, the identity of a device may be verified during subsequent profile download attempts in many ways. For example, FIG. 6 shows a flowchart 600 for verifying the identity of a device during subsequent profile download attempts, after the GUID is associated with the record of the device, according to another example embodiment. In an embodiment, flowchart 600 may be implemented by system 700, as shown in FIG. 7. FIG. 7 depicts a block diagram of a system 700 configured to verify the identity of a device during subsequent profile download attempts in accordance with an example embodiment. As shown in FIG. 7, system 700 comprises a device configuration process 720 and a device configuration service 726. Device configuration process 720 and device configuration service 726 are examples of device configuration process 320 and device configuration service 326, as respectively described above with reference to FIG. 3. As further shown in FIG. 7, device configuration service 726 may comprise one or more application programming interfaces (APIs) 702, a record analyzer 704 and/or a database 706, which are examples of APIs 302, record analyzer 304, and database 306, as respectively described above with reference to FIG. 3. Other structural and operational embodiments will be apparent to persons skilled in the relevant art(s) based on the following discussion regarding flowchart 600 and system 700 of FIG. 7.

Flowchart 600 begins with step 602. In step 602, a first hardware hash of a device, a GUID associated with the device, and an identity associated with a device is received. For example, with reference to FIG. 7, an API of API(s) 702 configured to receive messages from device configuration process 720 may receive a message 708 from device configuration process 720. Message 708 may comprise a first hardware hash of a device on which device configuration process 720 executes (e.g., computing device 102), a GUID associated with the device, and an identity associated with the device. The API of API(s) 702 may provide message 708 to record analyzer 704

In accordance with one or more embodiments, the GUID is a randomly-generated identifier. For example, with reference to FIG. 7, device configuration process 720 may comprise a random number generator 718. Random number generator 718 is configured to randomly-generate an identifier that is utilized as the GUID.

In accordance with one or more embodiments, the first hardware hash is based at least at one of a serial number of a motherboard (e.g., motherboard 104) of the device (e.g., computing device 102), a product key identifier associated with the device, at least one of a brand or model of the device, or a public key associated with a secure environment (e.g., a public key of the endorsement key (EKpub) of secure environment 132) of the device.

In step 604, a record associated with the device is accessed based on the identity associated with the device. For example, with reference to FIG. 7, record analyzer 704 of device configuration service 726 may provide a query 710 to database 706 to access a record associated with the device (e.g., computing device 102) based on the identity. For instance, query 710 may specify the identity.

In step 606, a determination is made that the record comprises the globally-unique identifier marker. For example, with reference to FIG. 7, database 706 may return the record via a response 712. Record analyzer 704 analyzes the record to determine that the record does comprises the GUID.

In step 608, responsive to determining that the record comprises the globally-unique identifier marker, a determination is made that the first hardware hash matches a second hardware hash associated with the record. For example, with reference to FIG. 7, record analyzer 312 analyzes the record and determines that the first hardware hash matches a second hardware hash associated with the record. Details regarding associated a second hardware hash with the record is described above with reference to FIGS. 4-5.

In step 610, responsive to determining that the first hardware hash matches the second hardware hash associated with the record, a configuration profile associated with the record is returned to the device. For example, with reference to FIG. 7, record analyzer 304 may generate a message 716 that comprises the configuration profile and provides message 716 to an API of API(s) 702 configured to provide messages to device configuration process 720. The API provides message 716 comprising the configuration profile associated with the record to device configuration process 720.

In accordance with one or more embodiments, the configuration profile specifies a setup sequence performed by an operating system of the device that is specific to the identity associated with the device.

In accordance with one or more embodiments, the setup sequence comprises one or more graphical user interface screens that enable a user of the device to configure one or more settings of the device that are specific to the identity associated with the device.

B. Pre-Reset Remediation

This type of remediation occurs after a device (e.g., computing device 102) has hardware components changed, but before operating system 118 is reset such that computing device 102 is restored to its original factory settings. Thus, operating system 118 still has references to the old hardware components. The idea of this remediation is to detect that the device has been impacted by the hardware components change and provide IT admins indicators early so they can fix up the device before it goes through OOBE next. This case is described as follows.

Referring again to FIG. 1, device configuration process 120 or identity manager process 124 may be configured to periodically determine the hardware fingerprint of computing device 102. Device configuration process 120 or identity manager process 124 may compare the periodically determined hardware fingerprint to a hardware fingerprint already cached on computing device 102 (e.g., stored in storage 108). The cached fingerprint may be stored at the time device configuration process 120 or identity manager process 124 initially determined the hardware fingerprint, for example, when computing device 102 is turned on for the first time.

If the fingerprints do not match, then device configuration process 120 may provide both fingerprints (i.e., the cached fingerprint and the periodically determined fingerprint), the GUID marker stored in firmware 116, the original profile provided to computing device 102 by device configuration service 126, and the identity ticket received from identity service 128 and retrieved by identity manager process 124 to device configuration service 126.

Device configuration service 126 attempts to find the original record associated with computing device 102 using the DDID included in the identity ticket and confirms that the identifier of the profile maintained by device configuration service 126 matches the DDID. If there is no match by the current DDID, the original cached hardware fingerprint is used to find the matching DDID.

Device configuration service 126 marks the record associated with computing device 102 as requiring remediation and the MDM syncs the remediation status. The MDM displays the device's remediation status in a list and returns the status via graph APIs.

For pre-reset devices that are still checking into the MDM, the IT admin can either select the impacted devices and click a button that restores the devices' registration state or do the same via graph APIs.

These devices can provide the hardware fingerprint to the MDM using existing CSPs (configuration service providers), and the device will need to be re-registered with device configuration service 126. The MDM may maintain the original device record which may now point to a different DDID.

The following happens during restoration of a device's registration with device configuration service 126: device configuration service 126 may duplicate the active record to a clean record with the fingerprint, etc., but with a different profile identifier and the latest DDID; device configuration service 126 may update the remediation status of the original device object and mark it as deprecated; and the new duplicated record will be cleared of any markers so the next post-reset operation will behave as a first use download.

III. Example Mobile Device and Computer System Implementation

System 100 (and the components thereof), system 300 (and the components thereof), system 500 (and the components thereof), system 700 (and the components thereof), and/or flowcharts 200, 400 and/or 600 may be implemented in hardware, or hardware combined with software and/or firmware. For example, operating system 118, device configuration process 120, identity manager process 124, device configuration service 126, and identity service 128, device configuration service 326, API(s) 302, record analyzer 304, database 306, device configuration process 320, random number generator 318, device configuration service 526, API(s) 502, record analyzer 504, database 506, identity service 528, API(s) 512, identity provider process 508, device configuration service 726, API(s) 702, record analyzer 704, database 706, device configuration process 720, and/or random number generator 718, and/or flowcharts 200, 400, and/or 600 may be implemented as computer program code/instructions configured to be executed in one or more processors and stored in a computer readable storage medium. Alternatively, various components of computing device 102 (e.g., processor(s) 110, memory 106, network interface 114, I/O interface(s) 130, storage 108, secure environment 132, non-volatile memory 112, device configuration process 120, identity manager process 124, device configuration service 126, and identity service 128 (and the components thereof), device configuration service 326 and device configuration process 320 (and the components thereof), device configuration service 526, identity service 528, and identity provider process 508 (and the components thereof), and device configuration service 726, and device configuration process 720 (and the components thereof) and/or flowcharts 200, 400, and/or 600 may be implemented as hardware logic/electrical circuitry.

For instance, in an embodiment, one or more, in any combination, of processor(s) 110, memory 106, network interface 114, I/O interface(s) 130, storage 108, secure environment 132, non-volatile memory 112, device configuration process 120, identity manager process 124, device configuration process 320, and/or device configuration process 720 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
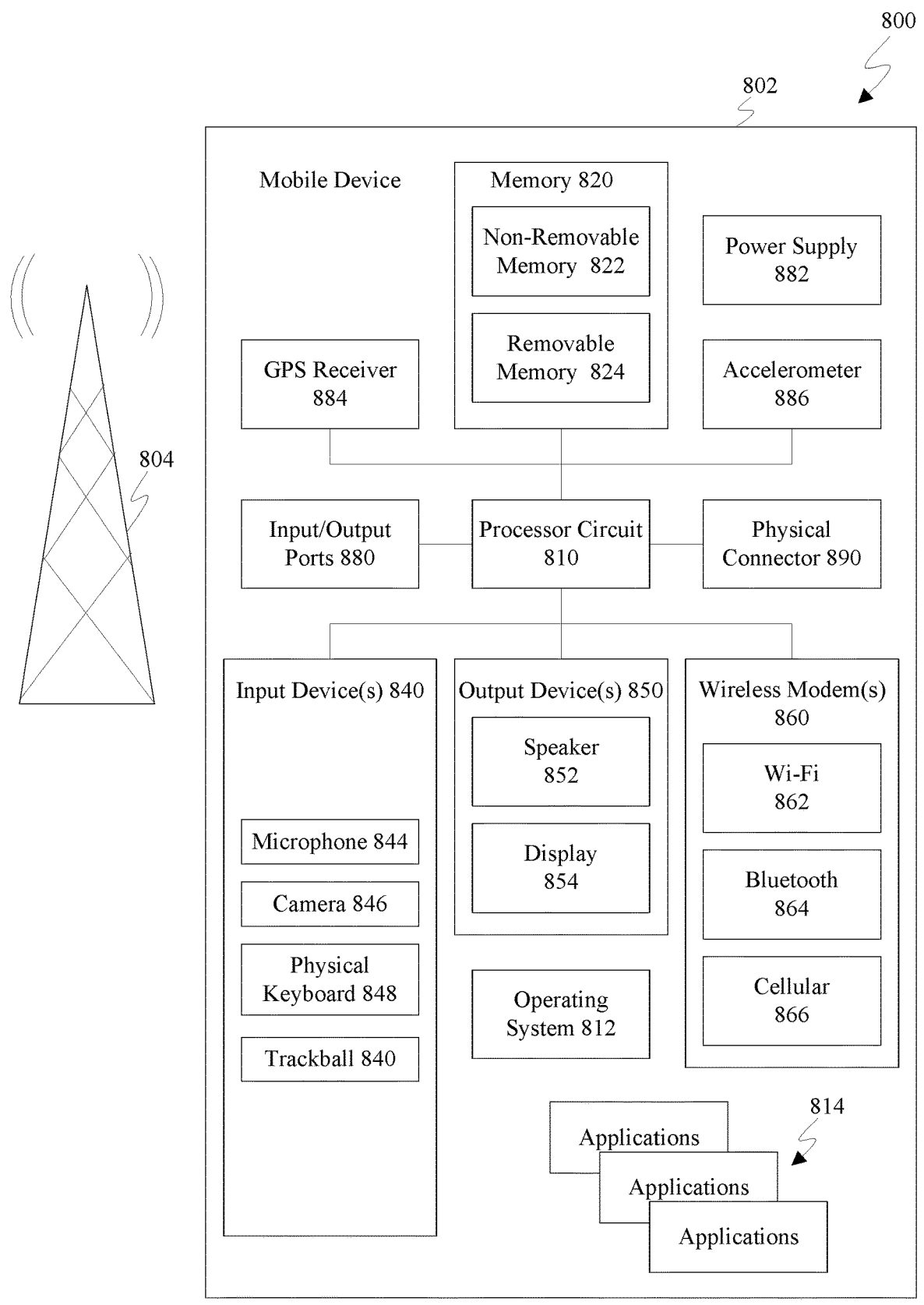
FIG. 8 shows a block diagram of an example mobile device that may be used to implement various example embodiments.

FIG. 8 is a block diagram of an exemplary mobile system 800 that includes a mobile device 802 that may implement embodiments described herein (e.g., computing device 102). For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA), etc.) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of including system 100 of FIG. 1, system 300 of FIG. 3, system 500 of FIG. 5, and/or system 700 of FIG. 7, along with any components and/or subcomponents thereof, as well as the flowcharts/flow diagrams described herein, including portions thereof, and/or further examples described herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts herein. Computer program logic for performing any of the operations, steps, and/or functions described herein may be stored in memory 820 and executed by processor 810.

Figure 9:
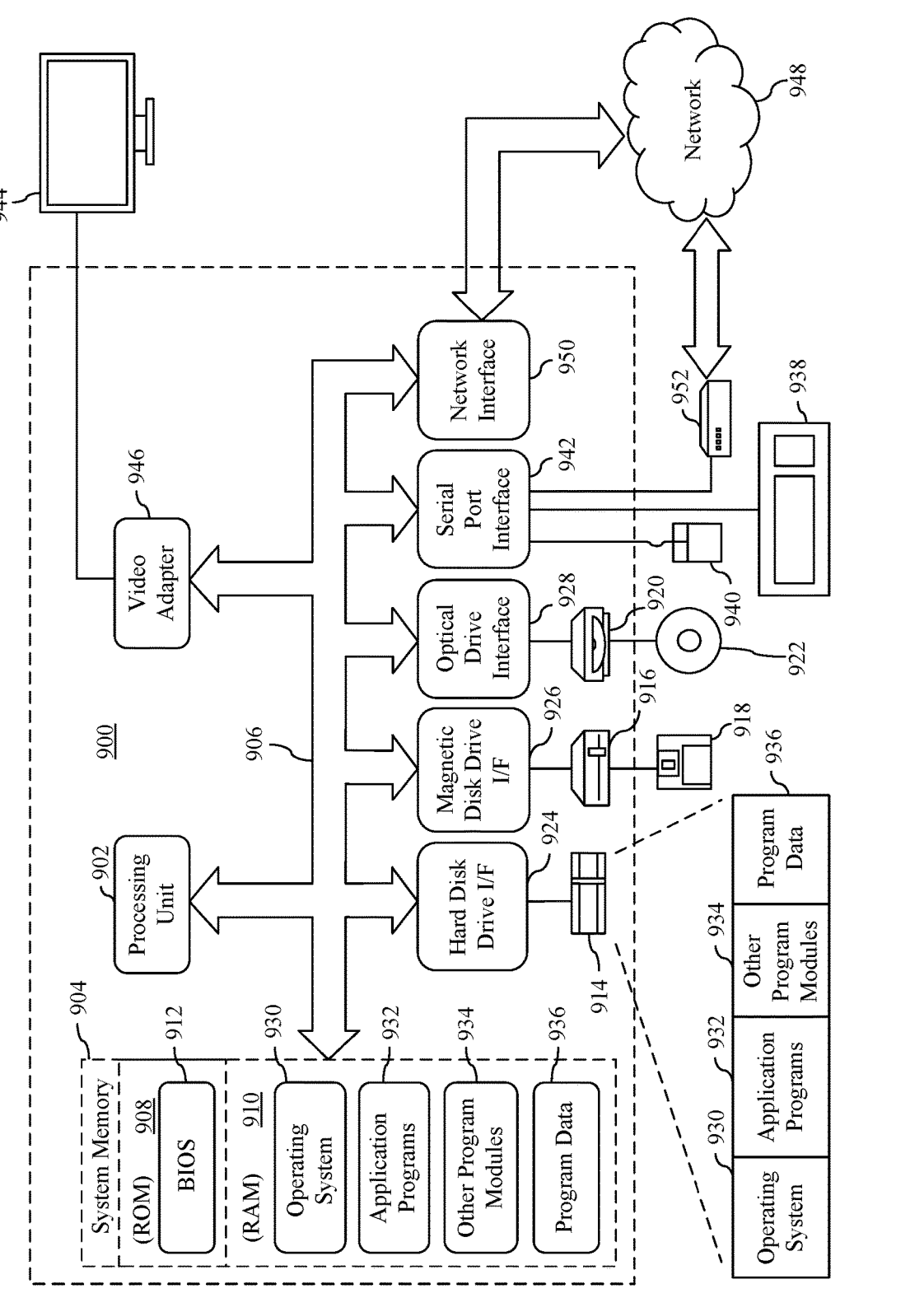
FIG. 9 shows a block diagram of an example computer system in which embodiments may be implemented.

FIG. 9 depicts an exemplary implementation of a computing device 900 in which embodiments may be implemented. For example, computing device 102, device configuration service 126, and identity service 128, device configuration service 326, device configuration process 320, device configuration service 526, identity service 528, identity provider process 508, device configuration service 726, and device configuration process 720 may each be implemented in one or more computing devices similar to computing device 900 in stationary or mobile computer embodiments, including one or more features of computing device 900 and/or alternative features. The description of computing device 900 provided herein is provided for purposes of illustration and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing device configuration process 120, identity manager process 124, device configuration service 126, identity service 128, device configuration process 320, device configuration service 326, device configuration service 526, identity service 528, identity provider process 508, device configuration service 726, and device configuration process 720 (and the various components thereof) and flowcharts 200, 400, and/or 600 (including any suitable step of flowcharts 200, 400, and/or 600), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system is described herein. The system includes at least one processor circuit; and at least one memory that stores program code configured to be executed by the at least one processor circuit. The program code configured to, when executed by the at least one processor circuit, cause the system to: receive a first hardware hash of a device, a globally-unique identifier marker associated with the device, and an identity associated with the device; access a record associated with the device based on the identity associated with the device; determine that the record does not comprise the globally-unique identifier marker; responsive to a determination that the record does not comprise the globally-unique identifier marker, determine that the first hardware hash matches a second hardware hash associated with the record; and responsive to a determination that the first hardware hash matches the second hardware hash associated with the record: associate the globally-unique identifier marker with the record; and return a configuration profile associated with the record to the device.

In one implementation of the foregoing system, the globally-unique identifier marker is a randomly-generated identifier.

In one implementation of the foregoing system, the program code further comprises a second application programming interface configured to: receive a message specifying the identity associated with the device and comprising the second hardware hash from an entity; access the record based on the identity associated with the device; and store the second hardware hash in the record.

In one implementation of the foregoing system, the device is a repaired device.

In one implementation of the foregoing system, the configuration profile specifies a setup sequence performed by an operating system of the device that is specific to the identity associated with the device.

In one implementation of the foregoing system, the setup sequence comprises one or more graphical user interface screens that enable a user of the device to configure one or more settings of the device that are specific to the identity associated with the device.

In one implementation of the foregoing system, the first hardware hash is based at least on one of: a serial number of a motherboard of the device; a product key identifier associated with the device; at least one of a brand or model of the device; or a public key associated with a secure environment of the device.

A method is also disclosed herein. The method includes: receiving a first hardware hash of a device, a globally-unique identifier marker associated with the device, and an identity associated with the device; accessing a record associated with the device based on the identity associated with the device; determining that the record does not comprise the globally-unique identifier marker; responsive to determining that the record does not comprise the globally-unique identifier marker, determining that the first hardware hash matches a second hardware hash associated with the record; and responsive to determining that the first hardware hash matches the second hardware hash associated with the record: associating the globally-unique identifier marker with the record; and returning a configuration profile associated with the record to the device.

In one implementation of the foregoing method, the globally-unique identifier marker is a randomly-generated identifier.

In one implementation of the foregoing method, the second hardware hash is associated with the record by: receiving a message from an entity, the message specifying the identity associated with the device and comprising the second hardware hash; accessing the record based on the identity associated with the device; and storing the second hardware hash in the record.

In one implementation of the foregoing method, the device is a repaired device.

In one implementation of the foregoing method, the configuration profile specifies a setup sequence performed by an operating system of the device that is specific to the identity associated with the device.

In one implementation of the foregoing method, the setup sequence comprises one or more graphical user interface screens that enable a user of the device to configure one or more settings of the device that are specific to the identity associated with the device.

In one implementation of the foregoing method, the first hardware hash is based at least on one of: a serial number of a motherboard of the device; a product key identifier associated with the device; at least one of a brand or model of the device; or a public key associated with a secure environment of the device.

A computer-readable storage medium having program instructions recorded thereon that, when executed by at least one processor, perform a method is further described herein. The method includes: receiving a first hardware hash of a device, a globally-unique identifier marker associated with the device, and an identity associated with the device; accessing a record associated with the device based on the identity associated with the device; determining that the record comprises the globally-unique identifier marker; responsive to determining that the record comprises the globally-unique identifier marker, determining that the first hardware hash matches a second hardware hash associated with the record; and responsive to determining that the first hardware hash matches the second hardware hash associated with the record, returning a configuration profile associated with the record to the device.

In one implementation of the foregoing computer-readable storage medium, the globally-unique identifier marker is a randomly-generated identifier.

In one implementation of the foregoing computer-readable storage medium, the second hardware hash is associated with the record by: receiving a message specifying the identity associated with the device and comprising the second hardware hash from an entity; and accessing the record based on the identity associated with the device; and storing the second hardware hash in the record.

In one implementation of the foregoing computer-readable storage medium, the entity is an original equipment manufacturer that repaired the device.

In one implementation of the foregoing computer-readable storage medium, the configuration profile specifies a setup sequence performed by an operating system of the device that is specific to the identity associated with the device.

In one implementation of the foregoing computer-readable storage medium, the setup sequence comprises one or more graphical user interface screens that enable a user of the device to configure one or more settings of the device that are specific to the identity associated with the device.

V Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
at least one processor circuit; and
at least one memory that stores program code configured to be executed by the at least one processor circuit, the program code configured to, when executed by the at least one processor circuit, cause the system to:

receive a first hardware identifier associated with a device, a globally-unique identifier marker associated with the device, and an identity associated with the device;

access a record associated with the device based on the identity associated with the device;

responsive to accessing the record, determine that the record does not comprise the globally-unique identifier marker;

responsive to a determination that the record does not comprise the globally-unique identifier marker, determine that the first hardware identifier matches a second hardware identifier associated with the record; and responsive to a determination that the first hardware identifier matches the second hardware identifier associated with the record:

associate the globally-unique identifier marker with the record; and return a configuration profile associated with the record to the device, wherein the first hardware identifier is based at least on one of:

a serial number of a hardware component of the device, a serial number of a chassis of the device, a device identifier, an identifier that uniquely identifies a hardware component of the device, a product key associated with the device, a manufacturer associated with the device, a brand associated with the device, a model associated with the device, a public key associated with a secure environment of the device, a media access control number associated with the device, or a system management basic input output system (SMBIOS) identifier.

2. The system of claim 1, wherein the globally-unique identifier marker is a randomly-generated identifier.

3. The system of claim 1, wherein the program code further comprises an application programming interface configured to:

receive a message specifying the identity associated with the device and comprising the second hardware identifier from an entity;

access the record based on the identity associated with the device; and store the second hardware identifier in the record.

4. The system of claim 1, wherein the device is a repaired device.

5. The system of claim 1, wherein the configuration profile specifies a setup sequence performed by an operating system of the device that is specific to the identity associated with the device.

6. The system of claim 5, wherein the setup sequence comprises one or more graphical user interface screens that enable a user of the device to configure one or more settings of the device that are specific to the identity associated with the device.

7. The system of claim 3, wherein the entity comprises a repairer of the device.

8. A method, comprising:

receiving a first hardware identifier associated with a device, a globally-unique identifier marker associated with the device, and an identity associated with the device;

accessing a record associated with the device based on the identity associated with the device;

responsive to accessing the record, determining that the record does not comprise the globally-unique identifier marker;

responsive to determining that the record does not comprise the globally-unique identifier marker, determining that the first hardware identifier matches a second hardware identifier associated with the record; and responsive to determining that the first hardware identifier matches the second hardware identifier associated with the record:

associating the globally-unique identifier marker with the record; and returning a configuration profile associated with the record to the device, wherein the first hardware identifier is based at least on one of:

a serial number of a hardware component of the device, a serial number of a chassis of the device, a device identifier, an identifier that uniquely identifies a hardware component of the device, a product key associated with the device, a manufacturer associated with the device, a brand associated with the device, a model associated with the device, a public key associated with a secure environment of the device, a media access control number associated with the device, or a system management basic input output system (SM-BIOS) identifier.

9. The method of claim 8, wherein the globally-unique identifier marker is a randomly-generated identifier.

10. The method of claim 8, wherein the second hardware identifier is associated with the record by:

receiving a message from an entity, the message specifying the identity associated with the device and comprising the second hardware identifier;

accessing the record based on the identity associated with the device; and storing the second hardware identifier in the record.

11. The method of claim 10, wherein the device is a repaired device.

12. The method of claim 8, wherein the configuration profile specifies a setup sequence performed by an operating system of the device that is specific to the identity associated with the device.

13. The method of claim 12, wherein the setup sequence comprises one or more graphical user interface screens that enable a user of the device to configure one or more settings of the device that are specific to the identity associated with the device.

14. The method of claim 10, wherein the entity comprises a repairer of the device.

15. A computer-readable storage medium having program instructions recorded thereon that, when executed by at least one processor, perform a method comprising:

receiving a first hardware identifier associated with a device, a globally-unique identifier marker associated with the device, and an identity associated with the device;

accessing a record associated with the device based on the identity associated with the device;

responsive to accessing the record, determining that the record comprises the globally-unique identifier marker;

responsive to determining that the record comprises the globally-unique identifier marker, determining that the first hardware identifier matches a second hardware identifier associated with the record; and responsive to determining that the first hardware identifier matches the second hardware identifier associated with the record, returning a configuration profile associated with the record to the device, wherein the first hardware identifier is based at least on one of:

a serial number of a hardware component of the device, a serial number of a chassis of the device, a device identifier, an identifier that uniquely identifies a hardware component of the device, a product key associated with the device, a manufacturer associated with the device, a brand associated with the device, a model associated with the device, a public key associated with a secure environment of the device, a media access control number associated with the device, or a system management basic input output system (SM-BIOS) identifier.

16. The computer-readable storage medium of claim 15, wherein the globally-unique identifier marker is a randomly-generated identifier.

17. The computer-readable storage medium of claim 15, wherein the second hardware identifier is associated with the record by:

receiving a message specifying the identity associated with the device and comprising the second hardware identifier from an entity;

accessing the record based on the identity associated with the device; and storing the second hardware identifier in the record.

18. The computer-readable storage medium of claim 15, wherein device is a repaired device.

19. The computer-readable storage medium of claim 15, wherein the configuration profile specifies a setup sequence performed by an operating system of the device that is specific to the identity associated with the device.

20. The computer-readable storage medium of claim 19, wherein the setup sequence comprises one or more graphical user interface screens that enable a user of the device to configure one or more settings of the device that are specific to the identity associated with the device.

21. The computer-readable storage medium of claim 17, wherein the entity comprises a repairer of the device.

* * * * *